United States Patent Office 3,422,104
Patented Jan. 14, 1969

---

3,422,104
9,10-DIHYDRO-11-AMINO-ALKYLENE-9,10-ETHANOANTHRACENES
Herbert Schröter, Reinach, and Daniel A. Prins, Oberwil, Switzerland, assignors to Geigy Chemical Corporation, Greenburgh, N.Y., a corporation of Delaware
No Drawing. Filed Oct. 20, 1964, Ser. No. 405,273
U.S. Cl. 260—247.1       24 Claims
Int. Cl. A61k *25/00;* C07d *31/00*

---

ABSTRACT OF THE DISCLOSURE

The compounds are of the class of 9,10-dihydro-9,10-ethanoanthracene, substituted in 11-position by a straight or branched chain alkylene of 1 to 5 carbon atoms both of which are substituted by amino, substituted amino, polymethyleneimino, morpholino, or piperazino. The compounds are useful spasmolytic, antidepressant and antiemetic agents. Illustrative embodiments are 11-dimethylaminomethyl-9,10-dihydro-9,10- ethanoanthracene, 11-morpholinomethyl-9,10-dihydro - 9,10 - ethanoanthracene, 4-chloro-11-methylaminomethyl-9,10-dihydro-9,10-ethanoanthracene, and 4-(9′,10′-dihydro-9′,10′-ethanoanthracene-11′-methyl)piperazine-(1)-ethanol.

---

The present invention concerns new basic derivatives of the ethanoanthracene series, processes for the production thereof as well as certain new starting materials therefor, and also a new method of treating certain types of mental illness with certain ethanoanthracene derivatives.

According to a first aspect of our invention, novel compounds falling under the general formula

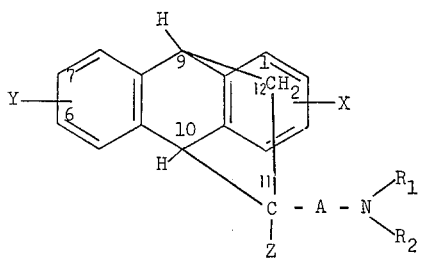

(IA)

wherein:

each of X and Y represents hydrogen, halogen, especially chlorine or bromine, lower alkyl, lower alkoxy, lower alkylthio, trifluoromethyl, N-substituted sulfamyl, especially N,N-di-(lower alkyl)sulfamyl, substituted amino, especially mono- and di-lower alkyl amino or lower alkylcarbonyl;
Z represents hydrogen or the methyl group;
A represents straight- or branched-chain alkylene having from 1 to 5 carbon atoms and preferably 2 to 4 carbon atoms, or alkylidene of from 2 to 5 carbon atoms;
$R_1$ represents lower alkyl, $R_2$ represents lower alkyl or cyclopropyl, and
$R_1$ and $R_2$ together with the nitrogen atom to which they are linked and, optionally, with the inclusion of oxygen or sulfur as ring member, also represent a saturated heterocyclic radical of 5 to 7 ring members, which have been produced by us for the first time, have been found to possess valuable pharmaceutical properties. In particular, they are useful as spasmolytics as evidenced, for example, by their antagonistic activity against acetylcholine and barium chloride in pharmacological tests.

The pharmaceutically acceptable salts of the compounds of Formula IA with inorganic or organic acids have similar pharmaceutical usefulness as spasmolytics.

Administration of spasmolytic agents containing a compound of Formula IA or its salt as the active ingredient should be limited, depending on the severity of the case, to a dose of between 20 and 250 milligrams.

According to another aspect of the invention, compounds of the general formula

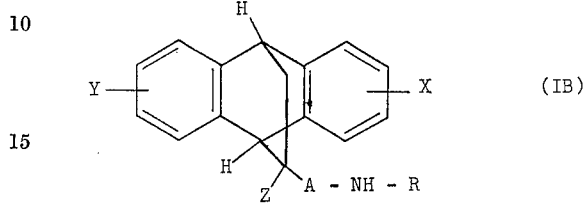

(IB)

wherein X, Y, Z and A have the above given meanings but A is preferably —$CH_2$— and R represents hydrogen, lower alkyl or cyclopropyl, as well as their pharmaceutically acceptable salts with inorganic or organic acids have been found by us to possess a very significant antagonistic action to reserpine.

These compounds are useful especially as antidepressives in the treatment of such mental disorders as endogenous depressions, by administering them orally, or, in the form of aqueous solutions of their water-soluble pharmaceutically aceptable salts, also parenterally. Application in dosage unit form should be limited to total doses between 50 and 300 milligrams daily.

The central nervous system-stimulating activities of a compound according to the invention, namely (A) 11-methylaminomethyl-9,10 - dihydro-9,10-ethanoanthracene hydrochloride prepared as described further below, falling under Formula IB, have been compared with the same activities of the previously known 9-aminoalkyl-9-10-dihydro-9,10-ethanoanthracene, designated as (B).

The results are compiled in the following table:

| Tested Property | Compound | |
|---|---|---|
| | (A) | (B) |
| Reserpine antagonistic action:[2] A dose of 25 mg./kg. i.p. of test compound administered 30 min. prior to 2 mg./kg. s.c. of reserpine antagonises contraction of the eyelids by | [1] 65% | 0% |
| Potentiation of Noradrenaline:[3] 0.6 mg./kg. i.v. cause the following potentiation of the effect of a standard dose of noradrenaline on the nictitating membrane of the cat[4] | 4.3 | 0.7 |
| Toxicity: $DL_{50}$ mouse i.v., mg./kg | 42 | 47 |

[1] The action is of quick onset.
[2] See W. Theobald et al., Arch. Int. Pharmacodyn. 148, 565 (1964).
[3] See W. Theobald et al., Arch. Int. Pharmacodyn. 148, 576 (1964).
[4] Values greater than 1 indicate potentiation, values smaller than 1 indicate antagonism to the action of noradrenaline.

According to a third aspect of the invention, we have found that novel compounds falling under the general formula

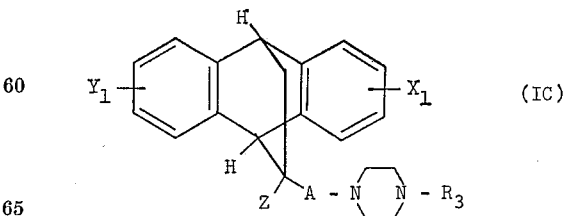

(IC)

wherein Z and A have the same meaning as in Formula IA, but A is, preferably —$CH_2$—; each of $X_1$ and $Y_1$ represents hydrogen, halogen, especially chlorine, lower alkoxy, lower alkylthio, and N-lower alkyl-substituted sulfamyl, and $R_3$ represents hydrogen, lower alkyl, hydroxy-lower alkyl, lower alkoxy-lower alkyl or lower alkanoyloxy-lower alkyl, and their pharmaceutically acceptable salts with acids, particularly those defined further below, possess valuable pharmaceutical activity and are useful especially as antiemetics.

Antimetic agents containing a compound of Formula IC or its salts should be administered in dosage unit form, the daily dose normally not exceeding 200 milligrams.

The term lower as used in the specification and the appended claims in connection with "alkyl," "alkoxy," "alkanoyl" and "alkanoyloxy" means radicals having from 1 to 4 carbon atoms.

In the compounds of general Formulas IA, IB and IC, X and Y, or $X_1$ and $Y_1$ in the respective cases, can take the 1-, 2-, 3-, or 4-, or the 5-, 6-, 7-, or 8- position. As lower alkyl radicals they represent, for example, the methyl, ethyl, n-propyl, isopropyl, n-butyl or tert-butyl group. A represents, for example, the mehylene, ethylidene, propylidene, ethylene, propylene, trimethylene, 1-methyltrimethylene, 2-methyltrimethylene or 2-ethyltrimethylene radical; $R_1$ and $R_2$, as lower alkyl, represent for examples, the methyl, ethyl, n-propyl, isopropyl or n-butyl radical. $R_2$ also represents the cyclopropyl group. If $R_1$ and $R_2$ together with the adjacent nitrogen atom form a heterocyclic radical, then this is, e.g. the 1-pyrrolidinyl, piperidino, hexamethyleneimino, morpholino, 1-piperazinyl, 4-methyl-1-piperazinyl, 4-(2'-hydroxyethyl)-1-piperazinyl, 4-(2'-acetoxyethyl)-1-piperazinyl, 4-methyl-1-homopiperazinyl or 4-(2'-hydroxyethyl)-1-homopiperazinyl radical.

In the first process for producing compounds of the general formula

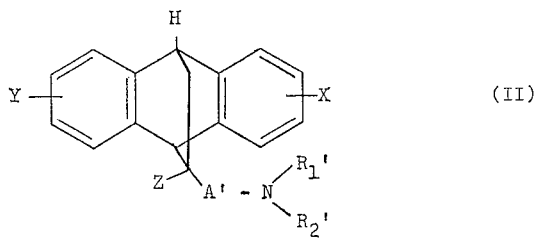

which formula embraces Formulas IA, IB and IC, and wherein A, X, Y and Z have the meanings given hereinbefore and Am represents one of the radicals

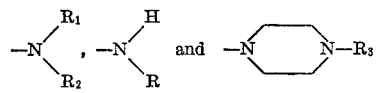

wherein R, $R_1$, $R_2$ and $R_3$ also have the meanings given hereinbefore, a compound of the general formula

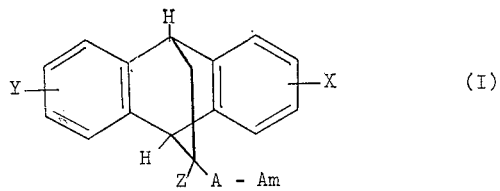

wherein X, Y and Z have the meanings given above and A', $R_1'$ and $R_2'$ have the meanings given for A, $R_1$ and $R_2$ respectively, but in at least one of these groups A', $R_1'$ and $R_2'$ a methylene group bound to the nitrogen is replaced by a carbonyl group, or $R_1'$ is a lower alkoxycarbonyl group and A' and $R_2'$ have the meanings given for A and $R_2$, or $R_1'$ and $R_2'$ together with the nitrogen and, optionally, with the inclusion of oxygen, the imino group, a lower alkylimino group as ring member, represent a saturated heterocyclic radical of 5–7 ring members, is reduced by means of a complex metal hydride, in particular lithium aluminum hydride, in an organic solvent, e.g. in an ethereal liquid such as diethyl ether, dibutyl ether, tetrahydrofuran or dioxan. The reduction of compounds of the general Formula II can be performed at a temperature ranging from room temperature to the boiling temperature of the solvent used. Compounds of Formula I having a hydroxyalkylimino group can, if desired, be acylated by known methods.

The starting materials, which are all embraced by Formula II, belong to three different groups: compounds which contain a carbonyl group in A', those containing a carbonyl group in $R_1'$ and those containing it in A' and in $R_1'$.

The first group of carboxylic acid amides used according to the invention, which are embraced by general Formula II are obtained, e.g. from the 9,10-dihydro-9,10-ethanoanthracene-11-acetic acids which may be α-alkylated if desired or from the α and/or β-alkylated 9,10-dihydro-9,10-ethanoanthracene-11-propionic acids or -11-carboxylic acids, by converting these carboxylic acids by means of thionyl chloride into the carboxylic acid chlorides and converting these with amines of the formula

wherein $R_1$ and $R_2$ have the meanings given in Formula IA, into the corresponding amides. As examples can be mentioned the methylamide, morpholide, 4-(2'-hydroxyethyl)-piperazide of 9,10-dihydro-9,10-ethanoanthracene-11-carboxylic acid, also the methylamide, diethylamide, 4-methyl-homopiperazide, piperidide of 9,10-dihydro-9,10-ethanoanthracene-11-acetic acid as well as the α-methyl and α-ethyl derivatives of this acid, finally the methylamide, diethylamide, propylamide, isoproylamide, and 4'-methylpiperazide of 9,10-dihydro-9,10-ethanoanthracene-11-propionic acid and the α-methyl and β-methyl derivatives of this acid.

The second group of starting materials of Formula II used according to the invention, wherein $R_1'$ contains a carbonyl group or is an alkoxycarbonyl group, A' has the meaning of A and $R_2'$ is hydrogen, are obtained by starting from 11- aminomethyl-9,10-dihydro-9,10-ethanoanthracene or from amines of the general formula

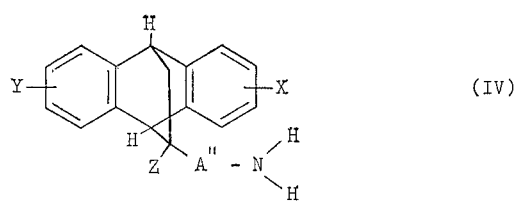

wherein X, Y and Z have the meanings given in Formula I and A" represents a straight or branched-chain alkylene or alkylidene radical having from 2 to 5 carbon atoms, condensing these amines with reactive functional derivatives of lower alkanoic acids such as the esters, halides or anhydrides thereof, to lower alkanoylaminoalkyl-9,10-dihydro-9,10-ethanoanthracene derivatives, or reacting them with lower alkyl haloformates such as methyl and ethyl chloroformates, or di-(lower alkyl) carbonates such as diethyl carbonate, to form lower alkyl-(9,10-dihydro-9,10-ethanoanthracene-11-yl-alkyl)-carbamates.

Primary amines of Formula IV are obtained, for example, by reducing the optionally α-alkylated 9,10-dihydro-9,10-ethanoanthracene-11-acetonitriles, as described hereinafter with lithium aluminum hydride in an organic solvent such as ether, tetrahydrofuran or N-methyl-morpholine, or catalytically reducing them by means of hydrogen, e.g. in the presence of Raney nickel or of palladium on wood charcoal in an organic solvent such as methanol or ethanol, to the optionally β-alkylated 11-(2'-aminoethyl) - 9,10-dihydro-9,10-ethanoanthracene derivatives.

The homologous 11-(3′-aminopropyl)-9,10-dihydro-9,10-ethanoanthracene compounds or their β- and/or γ-alkylated derivatives are produced, e.g. from the 9,10-dihydro-9,10-ethanoanthracene-11-propionyl chlorides or from their α- and/or β-alkylated derivatives mentioned above. These carboxylic acid chlorides are condensed, e.g. with aqueous ammonia in an organic solvent such as benzene, to the carboxylic acid amides which can be reduced to the primary amines, e.g. with lithium aluminum hydride in an organic solvent such as tetrahydrofuran. Examples in which $R_1'$ represents the carbonyl group or is an alkoxycarbonyl group are 11-(1′-propionylaminoethyl)-, 11-(2′-formylaminoethyl)-, 11 - (3′ - propionylamino - 2′-methylpropyl)-9,10-dihydro-9,10-ethanoanthracene and ethyl (9,10-dihydro-9,10-ethanoanthracene-11-methyl)-carbamate. Compounds in which the 9,10-dihydro-9,10-ethanoanthracene-11-yl radical is substituted can be produced by analogous processes; for instance 11-formylaminomethyl - 1 - methyl - 9,10 - dihydro - 9,10 - ethanoanthracene.

The third group of starting materials of the general Formula II usable according to the invention, in which A′ and $R_1'$ contain a carbonyl group, are obtained by, for example, condensing 9,10-dihydro-9,10-ethanoanthracene-11-carbonyl chloride, 9,10-dihydro-9,10-ethanoanthracene-11-acetyl chloride, its α-alkylated derivatives and 9,10-dihydro-9,10-ethanoanthracene - 11 - propionyl chloride as well as the α- and/or β-alkylated derivatives, with alkali metal compounds of low N-alkylcarboxylic acid amides. An example of this group is N-acetyl-N-methyl-9,10-dihydro-9,10-ethanoanthracene - 11 - carboxamide. Compounds such as, e.g. N-acetyl-N-methyl-1-chloro - 9,10 - dihydro - 9,10 - ethanoathracene - 11 - acetamide, which are substituted in the 9-10-dihydro-9,10-ethanoanthracene-11-yl radical can be produced analogously.

Compounds falling under the Formula I are obtained by a second process by reacting compounds of the general formula

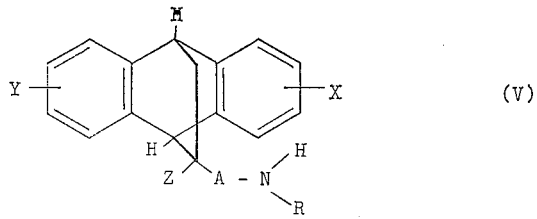

wherein X, Y, Z, A and $R_2$ have the meanings given in Formula IB but wherein R is lower alkyl or hydrogen, with a saturated aliphatic oxo compound having 1–5 carbon atoms, and reducing the reaction product either subsequently or simultaneously. Intermediate products, e.g. imines, are reduced, for example with sodium borohydride, lithium aluminum hydride, formic acid, or by catalytic hydrogenation. Formaldehyde, acetaldehyde, propionaldehyde, butyraldehyde, isobutyraldehyde, acetone, butanone, isopropyl methyl ketone are mentioned as aliphatic oxo compounds.

The secondary amines used as starting materials which are already embraced by general Formula I can be produced, e.g. by the first process.

The third process for producing compounds of general Formula I in which Am represents $—NH_2$ comprises reducing, e.g. by catalytic hydrogenation a compound of the general formula

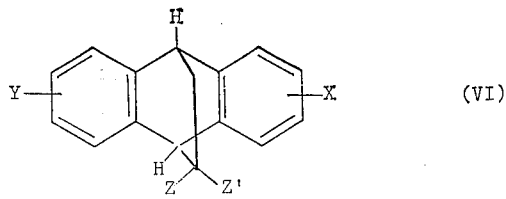

wherein X, Y and Z have the meanings given above, and Z′ represents a branched or straight-chain cyano-alkyl-, cyanoalkylidene-, hydroxyiminoalkyl- or hydroxyiminoalkylidene radical having at most 5 carbon atoms or further the cyano group, provided that at least one of the symbols X, Y and Z is different from hydrogen, to convert the cyano group or the hydroxyimino group to the corresponding aminomethyl or amino groups, respectively.

The reduction of a compound of Formula VI is preferably carried out by means of a complex metal hydride, especially by lithium aluminum hydride in an organic solvent e.g. in an ether-like solvent such as diethyl ether, dibutyl ether, tetrahydrofuran or in dioxan or with metallic sodium in an organic solvent such as butanol.

The starting material of Formula VI, wherein Z′ represents the cyano group, can be obtained by reacting anthracene derivatives of the general formula

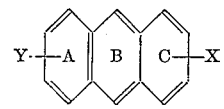

which can be substituted in the rings A and C, with acrylonitrile or with methacrylonitrile.

Examples of starting materials of Formula VI are the 11-cyano-9,10-dihydro-9,10-ethanoethanracene which are substituted in the benzo rings: 1-chloro-11-cyano-9,10-dihydro-9,10-ethanoanthracene, 4-chloro-11-cyano-9,10-dihydro-9,10-ethanoanthracene.

Starting materials of the general Formula VI, wherein Z′ represents a branched or straight-chain cyanoalkyl radical of at most 5 carbon atoms can be prepared by reacting the reactive esters, especially the p-toluenesulfonates of 9,10-dihydro-9,10-ethanoanthracene-11-alkanols with sodium cyanide in an inert solvent e.g. dimethylsulfoxide. 9,10-dihydro-9,10-ethanoanthracene-11-acetonitrile can be prepared in this manner starting from 9,10-dihydro-9,10-ethanoanthracene-11-methyl p-toluene sulfonate.

Further starting materials of Formula VI, wherein Z′ represents a hydroxyliminoalkyl radical of at most 5 carbon atoms can be obtained by heating under reflux the substituted or unsubstituted 9,10-dihydro-9,10-ethanoanthracene with hydroxylamine hydrochloride in the presence of pyridine.

A fourth process for the production of compounds falling under general Formula I comprises splitting into acid an amine a compound of the general formula

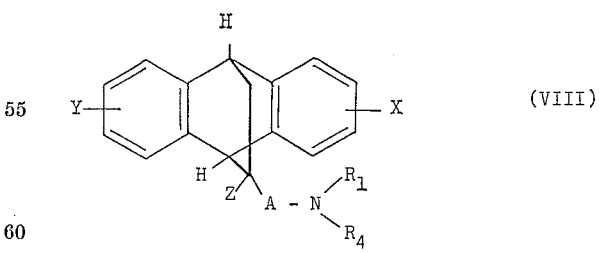

wherein X, Y, $R_1$, Z and A have the meanings given in Formula I, and $R_4$ represents a radical $—CO—R_5$ wherein $R_5$ represents chlorine, alkyl, aryl, aralkyl, alkoxy, aryloxy or aralkoxy, or $R_4$ represents arylsulfonyl, especially p-toluenesulfonyl, or $R_1$ and $R_4$ together with the adjacent nitrogen, the phthalimide radical, and with the inclusion as ring member, of an $R_4$-substituted imino group, form a saturated heterocyclic radical of 5 to 7 ring members. The radical $—CO—R_5$ in compounds of general Formula VIII can be split off by acid or alkaline hydrolysis or by thermolysis and when $R_4$ is p-toluene sulfonyl, it can be split, e.g. by treatment with sodium in ammonia.

Starting materials of Formula VIII usable according to the invention are obtained, e.g. by starting from the 11-acylaminoalkyl-9,10-dihydro-9,10-ethanoanthracene embraced by Formula II wherein A' has the meaning of A, $R_2'$ is hydrogen and $R_1'$ is an acyl radical. These compounds are converted into e.g. the sodium derivatives which are alkylated with a low alkylating agent such as e.g. methyl iodide, dimethyl sulfate or n-butyl bromide.

A further method for the production of starting material of Formula VIII according to the invention consists in reacting compounds of the general Formula I, wherein $R_1$ and $R_2$ represent each an alkyl group and which have been obtained by the first process, with an organic acid halide or anhydride, especially chloroformic ester, acetic anhydride, acetyl bromide, benzoyl chloride or phosgene.

Further compounds of Formula VIII are obtained by condensing reactive esters of the hydroxy compounds of general formula

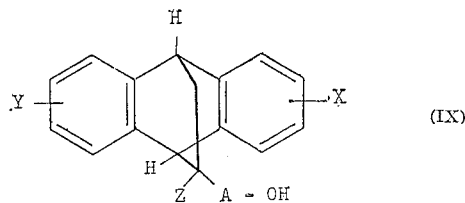

wherein X, Y, Z and A have the meanings given in Formula I, with carboxylic acid amides of the general formula

wherein $R_1$ and $R_4$ have the meanings given in Formula VIII, in the presence of an acid accepting agent or with the metal derivatives of such amides.

Ethyl (3-chloro-9,10-dihydro-9,10-ethanoanthracene-11-methyl)-carbamate and N-propyl-N-(4-chloro-9,10-dihydro-9,10-ethanoanthracene-11-ethyl) acetamide are mentioned as starting materials of Formula VIII.

The invention also includes pharmaceutically acceptable salts of the above defined bases of structural Formula I formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling, or with an excess of the acid in aqueous immiscible solvent, such as ethyl ether or chloroform, with the desired salt separating directly. Exemplary of such organic salts are those with methane sulfonic acid, ethane disulfonic acid, acetic acid, citric acid, malic acid, succinic acid, fumaric acid, maleic acid, tartaric acid, benzoic acid and phthalic acid. Exemplary of such inorganic salts are those with hydrochloric acid, hydrobromic acid, sulfuric acid and phosphoric acid. Of course, these salts may also be prepared by the classical method of double decomposition of appropriate salts which is well-known to the art.

The compounds of Formula I represent racemates, which can be resolved into their optical antipodes by known methods. Thereby it has been shown that the biological activity of the compounds of Formula I resides mainly in the levo-rotary form.

The following non-limitative examples further illustrate the production of the new compounds of general Formula I. The temperatures are in degrees Centigrade. All percentages are by weight unless expressly stated otherwise.

EXAMPLE 1

(a) 6.5 g. of 35% formaldehyde solution are added at 25° to a solution of 7.5 g. of 11-aminomethyl-9,10-dihydro-9,10-ethano-anthracene in 7.3 g. of anhydrous formic acid and the whole is refluxed for 12 hours. After cooling, 20 ml. of 2 N hydrochloric acid are added to the reaction mixture which is then extracted with 50 ml. of chloroform and the chloroform extract is washed with water. The aqueous phases are made alkaline with concentrated ammonia, extracted with ether, the etheral solution is washed with water, dried over sodium sulfate and evaporated in vacuo. The remaining oil crystallizes on standing and yields crude 11-dimethylamino-methyl-9,10-dihydro-9,10-ethanoanthracene, M.P. 70–78°, from which the hydrochloride is prepared with ethereal hydrochloric acid, M.P. 248–250° (from methanol/acetone).

EXAMPLE 2

(a) 178 g. of anthracene in 900 ml. of acetic anhydride are refluxed, 150 g. of methacrylonitrile are added dropwise to this solution within 1½ hours while stirring and the whole is then refluxed for 48 hours. After cooling, the precipitated crystals are filtered off under suction. 65 g. of unreacted anthracene are recovered. Acetic anhydride is removed from the filtrate in vacuo. The residue is extracted with 1.5 liters of hot methanol. On treating the methanol extract with animal charcoal and cooling, 130 g. of 11-cyano-11-methyl-9,10-dihydro-9,10-ethanoanthracene are obtained, M.P. 111–117°. After recrystallizing from acetone/diethyl ether it melts at 118–119°.

(b) An ether solution of 123 g. of 11-cyano-11-methyl-9,10-dihydro-9,10-ethanoanthracene is added dropwise within 45 minutes to a suspension of 15 g. of lithium aluminum hydride in 800 ml. of anhydrous diethyl ether whereupon the whole is refluxed for 15 hours. It is then cooled. A portion of 15 ml. of water, then 15 ml. of 15% sodium hydroxide solution and finally 45 ml. of water are added dropwise. The precipitate formed is filtered off under suction and washed with diethyl ether. The combined filtrates are concentrated in vacuo. 123 g. of crude 11-aminomethyl-11-methyl-9,10-dihydro-9,10-ethanoanthracene are obtained. The hydrochloride prepared in methanol with ethereal hydrochloric acid crystallizes from methanol/diethyl ether. 123 g. of the hydrochloride of 11-aminomethyl-11-methyl-9,10-dihydro-9,10-ethanoanthracene are obtained M.P. 266–282°. After recrystallisation from methanol/acetone, it melts at 280–283°.

(c) Starting from 11-aminomethyl-11-methyl-9,10-dihydro-9,10-ethanoanthracene, 11-dimethylaminomethyl-11-methyl-9,10-dihydro-9,10-ethanoanthracene is obtained in an analogous manner as described in Example 1. Its hydrochloride, recrystallized from methanol/acetone, melts at 251–255°.

EXAMPLE 3

(a) Starting from 1-chloroanthracene and acrylonitrile, a mixture of 1-chloro- and 4-chloro-11-cyano-9,10-dihydro-9,10-ethanoanthracene is obtained in an analogous manner as described in Example 2(a).

(b) Starting from the mixture of 1-chloro- and 4-chloro-11-cyano-9,10-dihydro-8,10-ethanoanthracene, a mixture of 1-chloro- and 4-chloro-11-aminomethyl-9,10-dihydro-9,10-ethanoanthracene is obtained by following the procedure of Example 2(b). This mixture is then separated by fractional crystallization of the hydrochlorides. The hydrochloride of 1-chloro-11-aminomethyl-9,10-dihydro-9,10-ethanoanthracene M.P. 150–152°, crystallizes from acetone/diethyl ether, M.P. 282–287°, the hydrochloride of the 4-chloro derivative remaining in the mother liquors. These are converted to the free base with ammonia and fractionally crystallized from benzene/ether to yield 4-chloro-11-aminomethyl-9,10-dihydro-9,10-ethanoanthracene M.P. 150–152°.

(c) Starting from 1-chloro-11-aminomethyl-9,10-dihydro-9,10-ethanoanthracene, 1-chloro-11-dimethylaminomethyl-9,10-dihydro-9,10-ethanoanthracene is obtained by the procedure described in Example 1. Its hydrochloride, recrystallized from methanol/acetone, melts at 285–286°.

(d) Starting from 4-chloro-11-aninomethyl-9,10-dihydro-9,10-ethanoanthracene, 4-chloro-11-dimethylaminomethyl-9,10-dihydro-9,10-ethanoanthracene is obtained by the procedure described in Example 1. Its hydrochloride, recrystallized from methanol/acetone melts at 226–228°.

EXAMPLES 4 TO 12

(a) Starting with 2-chloroanthracene, or trifluoromethylanthracene prepared by conventional methods from 2-trifluormethyl anthraquinone, or 2-methoxyanthracene or 2-methylthioanthracene prepared by conventional methods from anthracene-2-thiol, or anthracene-1-sulfonic acid dimethylamide prepared by conventional methods from anthracene-1-sulfonyl chloride, or anthracene-2-sulfonic acid dimethylamide prepared by conventional methods from anthracene-2-sulfonyl chloride, or 1-acetamidoanthracene prepared by conventional methods from 1-aminoanthracene, or 2-acetamidoanthracene prepared by conventional methods from 2-aminoanthracene, or 2-(anthracen-1'-yl)-2-methyl-1,3-dioxolane prepared by conventional methods from 2-anthracenyl methyl ketone and acrylonitrile, and following the procedure described in Example 3(a), the following mixtures of isomers are obtained.

Example 4.—2-chloro- and 3-chloro-11-cyano-9,10-dihydro-9,10-ethanoanthracene,

Example 5.—2-trifluoromethyl- and 3-trifluormethyl-11-cyano-9,10-dihydro-9,10-ethanoanthracene, Example 6.—2-methoxy- and 3-methoxy-11-cyano-9,10-dihydro-9,10-ethanoanthracene, Example 7.—2-methylthio- and 3-methylthio-11-cyano-9,10-dihydro-9,10-ethanoanthracene, Example 8.—4-cyano-9,10-dihydro-9,10-ethanoanthracene-1-sulfonic acid dimethylamide and -4-sulfonic acid dimethylamide, Example 9.—11-cyano-9,10-dihydro-9,10-ethanoanthracene-2-sulfonic acid dimethylamide and 3-sulfonic acid dimethylamide, Example 10.—1-acetamido- and 4-acetamido-11-cyano-9,10-dihydro-9,10-ethanoanthracene, Example 11.—2-acetamido-and 3-actamido-11-cyano-9,10-dihydro-9,10-ethanoanthracene, Example 12.—2-(11'-cyano-9',10'-dihydro-9',10'-ethanoanthracene-1-yl)-2-methyl-1,3-dioxolane and -4-yl)-2-methyl-1,3-dioxolane.

(b) Starting with these mixtures numbered (4) to (12) as obtained in step (a) above and following the procedure of Example 2(b), the following mixtures of isomers are obtained:

(4) 2-chloro- and 3-chloro-11-aminomethyl-9,10-dihydro-9,10-ethanoanthracene, (5) 2-trifluoromethyl- and 3-trifluoromethyl-11-aminomethyl-9,10-dihydro-9,10-ethanoanthracene, (6) 2-methoxy- and 3-methoxy-11-aminomethyl-9,10-dihydro-9,10-ethanoanthracene, (7) 2-methylthio- and 3-methylthio-11-aminomethyl-9,10-dihydro-9,10-ethanoanthracene, (8) 11-aminomethyl-9,10-dihydro-9,10-ethanoanthracene-1-sulfonic acid dimethylamide and -4-sulfonic acid dimethylamide, (9) 11-aminomethyl-9,10-dihydro-9,10-ethanoanthracene-2-sulfonic acid dimethylamide and -3-sulfonic acid dimethylamide,

(10) 1-ethylamino- and 4-ethylamino-11-aminomethyl-9,10-dihydro-9,10-ethanoanthracene,

(11) 2-ethylamino- and 3-ethylamino-11-aminomethyl-9,10-dihydro-9,10-ethanoanthracene,

(12) 2-(11'-aminomethyl-9'-10'-dihydro-9',10'-ethanoanthracene-1'-yl)-2-methyl-1,3-dioxolane and -4'-yl)-2-methyl-1,3-dioxolane, The separation of these mixtures into the individual compounds is carried out by fractional crystallization analogous to the procedure described in Example 3(b).

(c) Starting with the individual intermediate obtained in step (b) supra, and following the procedure described in Example 1, the following compounds are obtained:

Example 4.—2-chloro- and 3-chloro-11-dimethylaminomethyl-9,10-dihydro-9,10-ethanoanthracene, Example 5.—2-trifluoromethyl- and 3-trifluoromethyl-11-dimethylaminomethyl-9,10-dihydro-9,10-ethanoanthracene, Example 6.—2-methoxy- and 3-methoxy-11-dimethylaminomethyl-9,10-dihydro-9,10-ethanoanthracene, Example 7.—2-methylthio- and 3-methylthio-11-dimethylaminomethyl-9,10-dihydro-9,10-ethanoanthracene, Example 8.—11-dimethylaminomethyl-9,10-dihydro-9,10-ethanoanthracene-1-sulfonic acid di-methylamide and -4-sulfonic acid di-methylamide, Example 9.—11-dimethylaminomethyl-9,10-dihydro-9,10-ethanoanthracene-2-sulfonic acid di-methylamide and -3-sulfonic acid di-methylamide, Example 10.—1-ethylmethylamino- and 4-ethylmethylamino-11-dimethylaminomethyl-9,10-dihydro-9,10-ethanoanthracene, Example 11.—2-ethylmethylamino- and 3-ethylmethylamino-11-dimethylamino-9,10-dihydro-9,10-ethanoanthracene, Example 12.—11-dimethylaminomethyl-9,10-dihydro-9,10-ethanoanthracene-1-yl methyl ketone and -4-yl methyl ketone.

EXAMPLE 13

(a) A solution of 23 g. of 11-aminomethyl-9,10-dihydro-9,10-ethanoanthracene in 60 g. of methyl formate is refluxed for 24 hours. The cooled reaction mixture is diluted with ether, the ethereal solution is washed with 2 N hydrochloric acid and water, dried over sodium sulfate and evaporated in vacuo. After recrystallizing the residue from acetone, 11-formylaminomethyl-9,10-dihydro-9,10-ethanoanthracene is obtained, M.P. 127–128°.

(b) A solution of 26 g. of the formylamine obtained according to (a) in 100 ml. of anhydrous tetrahydrofuran is added dropwise within 1 hour to a suspension of 3.8 g. of lithium aluminum hydride in 250 ml. of anhydrous ether. After refluxing for 15 hours, first 3.8 ml. of water, then 3.8 ml. of 15% sodium hydroxide solution and finally 11.4 ml. of water are added at 20°. The granular precipitate is filtered off under suction and washed with ether. The combined filtrates are evaporated in vacuo, the residue is taken up in ether and the ethereal solution is extracted with 2 N hydrochloric acid. The acid extracts are then made alkaline with ammonia and extracted with ether. After washing the ethereal solution with water and drying over sodium sulfate, the solvent is evaporated off. The crude 11-methylaminomethyl-9,10-dihydro-9,10-ethanoanthracene which remains is converted into the hydrochloride with ethereal hydrochloric acid, M.P. 309–311° (with decomposition) (recrystallized from methanol/acetone).

(c) The resolution of the above racemic hydrochloride into its optical antipodes is carried out as follows:

50 g. of 11-methylaminomethyl-9,10-dihydro-9,10-ethanoanthracene are dissolved in 200 ml. of ethyl acetate and, after heating, a hot solution of 36 g. of dibenzoyl-D-tartaric acid in 100 ml. of ethyl acetate is added. On cooling, filtering the precipitated crystals off under suction, concentrating the mother liquor again and filtering the further crystal fractions off under suction, a total of 80 g. of neutral salt is obtained as a mixture of the two diastereomers. This mixture is separated by fractional crystallization from methanol. After repeated recrystallization of the peak fraction to constant specific rotation, 16 g. of (—)-11-methylaminomethyl-9,10-dihydro-9,10-ethanoanthracene dibenzoyl-D-tartrate are obtained. M.P. 177–180°, $[\alpha]_D^{23}$: —55°, c.=1.00 in methanol.

Distribution of this salt between aqueous ammonia and diethyl ether, removal of the ethereal phase, washing neutral with water, drying over sodium sulfate and concentrating in vacuo yields 9.0 g. of (—)-11-methylaminomethyl-9,10-dihydro-9,10-ethanoanthracene in the form of an oil, $[\alpha]_D^{24}$: —14.59, c.=1.04 in chloroform. The hydrochloride prepared therefrom with ethereal hydrochloric acid crystallizes from methanol/acetone. M.P. 269–270°, $[\alpha]_D^{23}$: —9.1°, c.=0.98 in methanol.

For corroboration, this salt was converted into the acid D-tartrate, M.P. 126°/159–161° from methanol/acetone, $[\alpha]_D^{23}$: +3.2°, c.=1.10 in methanol. The melting point and specific rotation remained constant during further recrystallization from methanol/acetone.

By fractional crystallization of the mother liquors of (±)-11-methylaminomethyl - 9,10 - dihydro-9,10-ethanoanthracene dibenzoyl-D-tartrate, (+)-11-methylaminomethyl-9,10-dihydro-9,10-ethanoanthracene dibenzoyl-D-tartrate is obtained in an analogous manner, M.P. 157–160°, $[\alpha]_D^{23}$: —45.3°, c.=0.98 in methanol, and from this the hydrochloride of (+)-11-methylaminomethyl-9,10-dihydro-9,10-ethanoanthracene is obtained. M.P. 266–270° from methanol/acetone. $[\alpha]_D^{23}$: +6.2, c.=1.04 in methanol.

The racemic end products obtained in all other examples can be resolved into their optical antipodes in a similar manner.

EXAMPLE 14

Starting from 11-aminomethyl-11-methyl-9,10-dihydro-9,10-ethanoanthracene by way of 11-formylaminomethyl-11-methyl - 9,10 - dihydro - 9,10 - ethanoanthracene, M.P. 170°, 11-methylaminomethyl - 11 - methyl-9,10-dihydro-9,10-ethanoanthracene is obtained in an analogous manner as described in Example 13. The hydrochloride, recrystallized from methanol/acetone, melts at 179–181°.

EXAMPLE 15

By the same procedure as described in Example 13, but starting from 4-chloro-11-aminomethyl-9,10-dihydro-9,10-ethanoanthracene by way of 4-chloro-11-formyl-aminomethyl-9,10-dihydro-9,10-ethanoanthracene, M.P. 148–149°, 4-chloro-11-methylaminomethyl-9,10-dihydro-9,10-ethanoanthracene is obtained. The hydrochloride, recrystallized from methanol/acetone melts at 280–283°.

EXAMPLE 16

By the same procedure as described in Example 13, but starting from 1-chloro-11-aminomethyl-9,10-dihydro-9,10-ethanoanthracene by way of 1-chloro-11-formyl-aminomethyl - 9,10 - dihydro - 9,10 - ethanoanthracene, 1-chloro - 11 - methylaminomethyl - 9,10 - dihydro-9,10-ethanoanthracene is also obtained. The hydrochloride, recrystallized from methanol/acetone, melts at 287–292°.

EXAMPLES 17 TO 23

Starting with the following intermediate compounds, obtained according to the procedure of Examples 4 to 9 and 12(a) and (b), respectively, namely Example 17.—2-chloro- and 3-chloro-11-aminomethyl-9,10-dihydro-9,10-ethanoanthracene, Example 18.—2-trifluoromethyl- and 3-trifluoromethyl-11-aminomethyl-9,10-dihydro-9,10-ethanoanthracene, Example 19.—2-methoxy- and 3-methoxy-11-aminomethyl-9,10-dihydro-9,10-ethanoanthracene, Example 20.—2 - methylthio- and 3 - methylthio-11-aminomethyl-9,10-dihydro-9,10-ethanoanthracene, Example 21.—11 - aminomethyl - 9,10 - dihydro-9,10-ethanoanthracene-1-sulfonic acid dimethylamide and -4-sulfonic acid dimethylamide, Example 22.—11 - aminomethyl - 9,10 - dihydro-9,10-ethanoanthracene-2-sulfonic acid dimethylamide and -3-sulfonic acid dimethylamide, Example 23.—2-(11'-aminomethyl-9',10'-ethanoanthracene-1-yl)-2-methyl-1,3-dioxolane and -4'-yl)-2-methyl-1,3-dioxolane, and following the procedure of Example 13 there are obtained in an analogous manner via the N-formyl derivatives:

(17) 2-chloro- and 3-chloro-11-methylaminomethyl-9,10-dihydro-9,10-ethanoanthracene,

(18) 2-trifluoromethyl- and 3-trifluoromethyl-11-methylaminomethyl-9,10-dihydro-9,10-ethanoanthracene,

(19) 2-methoxy- and 3-methoxy-11-methylaminomethyl-9,10-dihydro-9,10-ethanoanthracene,

(20) 2-methylthio- and 3-methylthio-11-methylaminomethyl-9,10-dihydro-9,10-ethanoanthracene,

(21) 11 - methylaminomethyl - 9,10 - dihydro - 9,10-ethanoanthracene-1-sulfonic acid dimethylamide and -4-sulfonic acid dimethylamide,

(22) 11 - methylaminomethyl - 9,10 - dihydro - 9,10-ethanoanthracene-2-sulfonic acid dimethylamide and 3-sulfonic acid dimethylamide,

(23) 11 - methylaminomethyl - 9,10 - dihydro - 9,10-ethanoanthracene-1-yl methyl ketone and -4-yl methyl ketone.

EXAMPLE 24

29 g. of the mixture of 1-acetamido- and 4-acetamido-11-cyano-9,10-dihydro-9,10-ethanoanthracene obtained according to Example 10, step (a) is dissolved in 300 ml. of absolute ethanol saturated with anhydrous ammonia. 10 g. of a rhodium aluminumoxide catalyst are added. The solution is hydrogenated in a Parr apparatus at room temperature until the absorption of hydrogen is finished. The catalyst is filtered off and the filtrate is evaporated to dryness under reduced pressure. The residue is dissolved in ether and the solution is extracted with 2 N hydrochloric acid. The aqueous extract is made alkaline with concentrated ammonia and is extracted with ether. The dried ether extract is evaporated to dryness and yields 25 g. of a mixture of 1-acetamido- and 4-acetamido-11-aminomethyl-9,10-dihydro-9,10-ethanoanthracene.

This mixture is further treated as described in Example 13, steps (a) and (b), and a mixture of 1-ethylamino- and 4-ethylamino-11-methylamino - 9,10 - dihydro - 9,10-ethanoanthracene is obtained from which the isomers are then separated by fractional crystallization as exemplified in Example 3(b).

EXAMPLE 25

(a) While stirring 10 g. of 9,10-dihydro-9,10-ethanoanthracene-11-carboxylic acid are added within 15 minutes to 30 ml. of thionyl chloride, the temperature being kept at 10°. The mixture is then refluxed for 1 hour and subsequently concentrated in vacuo. The residue, dissolved in 25 ml. of benzene, is added dropwise at 25° within 15 minutes to a vigorously stirred solution of 7 g. of morpholine in 20 ml. of water. The reaction mixture is then kept for 1 hour at 70°, then diluted with benzene and the aqueous phase in separated. The organic phase is then washed with 2 N hydrochloric acid, 2 N sodium carbonate solution and water, dried over sodium sulfate and evaporated in vacuo. The oily 9,10-dihydro-9,10-ethanoanthracene-11-carboxylic acid morpholide obtained is crystallized from ether/pentane, M.P. 135–136°.

(b) 10.5 g. of the carboxylic acid morpholide produced according to step (a), supra, dissolved in 25 ml. of anhydrous tetrahydrofuran, is added dropwise to a suspension of 2 g. of lithium aluminum hydride in 100 ml. of anhydrous ether. The reaction mixture is refluxed for 15 hours, cooled and, at 20°, first 2 ml. of water, then 2 ml. of 15% sodium hydroxide solution and finally 6 ml. of water are added, the precipitate formed is filtered off under suction and washed with ether. The combined filtrates are acidified with 30 ml. of 2 N hydrochloric acid, the hydrochloride which precipitates is filtered off under suction, washed with ether and dried in vacuo. The crude hydrochloride of 11-morpholinomethyl-9,10-dihydro-9,10-ethanoanthracene obtained is recrystallized from methanol/acetone. M.P. 266–268°.

EXAMPLE 26

Starting from 9,10-dihydro-9,10-ethanoanthracene-11-carboxylic acid by way of the intermediate products 9,10-dihydro-9,10-ethanoanthracene-11 - carboxylic acid chloride and 9,10-dihydro-9,10-ethanoanthracene-11-carboxylic acid diethylamide, M.P. 99–100°, 11-diethylaminomethyl-9,10-dihydro-9,10-ethanoanthracene is obtained in an analogous manner as described in Example 25. The hydrochloride crystallizes from methanol/acetone, melts at 244–247°.

EXAMPLE 27

(a) While stirring 25 g. of 9,10-dihydro-9,10-ethanoanthracene-11-carboxylic acid are added within 20 minutes to 150 ml. of thionyl chloride while maintaining the temperature of the mixture at 10° and the whole is then refluxed for 1 hour. The reaction mixture is then concentrated in vacuo, the crude carboxylic acid chloride which remains is dissolved in 80 ml. of benzene and the benzene solution is added dropwise while stirring vigorously at 40–50° to a mixture of 53.5 g. of 1-piperazineethanol and 50 ml. of water, the addition being made within 15 minutes. The reaction mixture is then stirred for 1 hour at 70°, diluted with benzene and the phases are separated. The organic phase is washed with 2 N sodium carbonate solution and water and extracted with 2 N hydrochloric acid. The hydrochloric acid extract is made alkaline with concentrated ammonia and extracted with chloroform. The chloroform extract is washed with water and dried over sodium sulfate and evaporated in vacuo whereupon amorphous 4-(9',10'-dihydro-9',10'-ethanoanthracene-11'-carbonyl)-1-piperazine-ethanol is obtained. The hydrochloride prepared with ethereal hydrochloric acid is recrystallized from acetone/ether, M.P. 238–240°.

(b) A solution of 35.5 g. of the piperazide produced according to step (a) supra, in 150 ml. of anhydrous tetrahydrofuran is added dropwise to a suspension of 4.7 g. of lithium aluminum hydride in 400 ml. of anhydrous ether. The whole is refluxed for 15 hours, then at 20°, first 4.7 ml. of water, then 4.7 ml. of 15% sodium hydroxide solution and finally 14.1 ml. of water are added, the precipitate formed is filtered off under suction and washed with ether. The combined filtrates are concentrated in vacuo whereupon the remaining oil is taken up in methanol and this solution is acidified with ethereal hydrochloric acid. The crude 4-(9',10' - dihydro - 9',10' - ethanoanthracene - 11'-methyl)-1-piperazine-ethanol dihydrochloride which separates out is recrystallized from water/methanol. M.P. 240–250° or 268–270° in a sealed capillary tube.

EXAMPLE 28

By following the procedure of Example 27, but starting from 9,10-dihydro-9,10-ethanoanthracene-11-acetic acid, there is obtained by way of the intermediate products, 9,10-dihydro-9,10 - ethanoanthracene - 11 - acetyl chloride and 4-(9',10'-dihydro-9',10'-ethanoanthracene-11'-acetyl)-1-piperazine-ethanol, M.P. 159–161°, the final product 4-[2'-(9'',10''-dihydro - 9'',10'' - ethanoanthracene - 11''-yl)-ethyl]-1-piperazinethanol, which can also be defined as 11-(2'-[4''-(2'''-hydroxyethyl)-piperazino]-ethyl)-9,10-dihydro-9,10-ethanoanthracene. Recrystallized from diethylether/petroleum ether, it melts at 101–104°.

EXAMPLE 29

By following the procedure of Example 27, but starting from 9,10-dihydro-9,10-ethanoanthracene-11 - carboxylic acid, there is obtained by way of the intermediate product, 9,10-dihydro-9,10-ethanolanthracene-11 - carboxylic acid-piperazide, the final product 1-(9',10'-dihydro-9',10'-ethanoanthracene-11' - methyl) - piperazine difumarate. Recrystallized from methanol, it melts at 183–186°.

EXAMPLE 30

By following the procedure of Example 27, but starting from 9,10-dihydro-9,10-ethanoanthracene - 11 - carboxylic acid, there is obtained by way of the intermediate products 9,10-dihydro-9,10-ethanoanthracene - 11 - carboxylic acid chloride and 1-(9',10'-dihydro - 9',10' - ethanoanthracene-11'-carbonyl)-4-methyl-piperazine, M.P. 165–166°, the final product, 1-(9',10'-dihydro-9',10'-ethanoanthracene-11' - methyl) - 4 - methyl - piperizine. Recrystallized from ethanol, the dihydrochloride melts at 238–242°.

EXAMPLE 31

(a) 20 g. of 1-acetyl-9,10-dihydro-9,10-ethanoanthracene, 20 g. of hydroxylamine hydrochloride, 20 ml. of pyridine and 200 ml. of ethanol are refluxed for 2 hours. The reaction mixture is evaporated in vacuo, the residue is taken up in chloroform, the chloroform solution is washed with 2 N hydrochloric acid, 2 N sodium bicarbonate solution and water, dried over sodium sulfate and concentrated in vacuo. The 11-acetyl-9,10-dihydro-9,10-ethanoanthracene oxime obtained crystallized from ether/petroleum ether. M.P. 159–160°.

(b) 9.3 g. of the oxime produced according to (a) are dissolved in 80 ml. of anhydrous n-butanol and the solution is boiled under an atmosphere of nitrogen. 6.3 g. of sodium are added to this solution in small pieces within 20 minutes and the reaction mixture is refluxed for another 2 hours. It is then cooled and diluted with 200 ml. of ice water and 100 ml. of ether. After separating the organic phase this is evaporated in vacuo and the residue is taken up in ether. The ethereal solution is extracted with 2 N hydrochloric acid, the hydrochloric acid extract is made alkaline with concentrated ammonia and then extracted with ether. The ether solution is washed with water, dried over sodium sulfate, evaporated in vacuo and the residue is recrystallized from petroleum ether. 11-(1' - aminoethyl)-9,10-dihydro-9,10 - ethanoanthracene is obtained, M.P. 76–84°. The hydrochloride prepared with ethereal hydrochloric acid and crystallized from methanol-acetone melts at 258° or at 287–290° in a sealed capillary tube.

(c) 12 g. of 11-(1'-aminoethyl) - 9,10 - dihydro - 9,10-ethanoanthracene and 50 ml. of methyl formate are refluxed for 24 hours. The reaction mixture is then evaporated in vacuo, the residue is taken up in chloroform, the chloroform solution is washed with 2 N hydrochloric acid and water, dried over sodium sulfate and evaporated in vacuo. The remaining 11-(1'-formylaminoethyl)-9,10-ethanoanthracene, dissolved in 35 ml. of anhydrous tetrahydrofuran, is added dropwise to a suspension of 2 g. of lithium aluminum hydride in 100 ml. of anhydrous ether. The reaction mixture is then refluxed for 20 hours. Subsequently, at 20°, 2 ml. of water, then 2 ml. of 15% sodium hydroxide solution and finally 6 ml. of water are added, the precipitate formed is filtered off under suction and washed with ether. The combined filtrates are concentrated in vacuo, the residue is taken up in ether and extracted with 2 N hydrochloric acid. The hydrochloric acid extract is made alkaline with concentrated ammonia and then extracted with chloroform. The chloroform solution is washed with water, dried over sodium sulfate and concentrated in vacuo. The remaining 11 - (1' - methylaminoethyl) - 9,10-dihydro-9,10-ethanoanthracene yields the hydrochloride with ethereal hydrochloric acid. M.P. 258–260° (from methanol/acetone).

EXAMPLE 32

7.5 g. of 11-(1'-aminoethyl)-9,10-dihydro-9,10-ethanoanthracene produced as described in Example 31 (a) and (b) are dissolved in 6.1 ml. of anhydrous formic acid while cooling and 6.5 g. of 35% formaldehyde solution are added. The mixture is refluxed for 12 hours, cooled, 20 ml. of 2 N hydrochloric acid are added and it is then concentrated in vacuo. The residue is taken up in benzene and water, the aqueous phase is separated and the organic phase is extracted with 2 N hydrochloric acid. The hydrochloric acid extract is made alkaline with concentrated ammonia and then extracted with chloroform. On washing the chloroform extract with water, drying over sodium sulfate and evaporating the solvent in vacuo, 11-(1'-dimethylaminoethyl) - 9,10 - dihydro - 9,10 - ethanoanthracene is obtained, M.P. 127–130° (from petroleum ether). The acid maleate is produced with ethereal maleic acid; it melts at 198–199° (from methanol/ethyl acetate).

EXAMPLE 33

(a) 39 g. of p-toluene sulfonyl chloride are added at 10–15° to a solution of 47 g. of 9,10-dihydro-9,10-ethanoanthracene-11-methanol in 20 ml. of anhydrous pyridine. The reaction mixture is stirred for 15 hours at 20–25° and then the pyridine is evaporated in vacuo at under 30°. The residue solidifies on rubbing with ice water. It is filtered off under suction, washed with dilute hydrochloric acid and with water and dried. 9,10-dihydro-9,10-ethanoanthracene-11-methyl p-toluene-sulfonate is obtained, M.P. 143–144° (from chloroform/ether).

(b) 98 g. of the toluene sulfonate obtained according to (a) are added at 20° within 20 minutes to a suspension of 31 g. of sodium cyanide in 400 ml. of dimethylsulfoxide and the mixture is refluxed for 3 hours. After cooling, the reaction mixture is diluted with ice water and extracted with ether. The ether extract is washed with water, dried over sodium sulfate and concentrated in vacuo whereupon the residue solidifies in crystalline form. The crystals are filtered off under suction and washed with pentane. The crude product, after recrystallization from acetone/petroleum ether, yields pure 9,10-dihydro-9,10-ethanoanthracene-11-acetonitrile, M.P. 123–124°.

(c) 10.5 g. of the nitrile obtained according to (b) are dissolved in 20 ml. of anhydrous tetrahydrofuran and the solution is added within 30 minutes to a suspension of 1.3 g. of lithium aluminum hydride in 70 ml. of anhydrous ether. The reaction mixture is then refluxed for 15 hours and, at 20°, first 1.3 ml. of water, then 1.3 ml. of 15% sodium hydroxide and finally 4.2 ml. of water are added. The granular precipitate formed is filtered off under suction and washed with ether. The combined filtrates are concentrated in vacuo, the residue is dissolved in ether and extracted with 2 N hydrochloric acid. The hydrochloric acid extract is made alkaline with concentrated ammonia and extracted with ether, the ether extract is washed with water, dried over sodium sulfate and concentrated in vacuo. With ethereal hydrochloric acid, the residue yields 11-(2'-aminoethyl)-9,10-dihydro-9,10-ethanoanthracene hydrochloride, M.P. 240–246° which crystallizes from methanol/acetone.

(d) 7.5 g. of the 11-aminoethyl compound obtained according to procedure supra (c) are dissolved in 7.3 g. of formic acid (100%) while cooling and the solution is refluxed for 12 hours with 6.5 g. of 35% formaldehyde solution. 20 ml. of 2 N hydrochloric acid are then added to the cooled reaction mixture and it is concentrated in vacuo. The residue is dissolved in water, the solution is extracted with ether, then made alkaline with concentrated ammonia and extracted with chloroform. The chloroform extract is washed with water, dried over sodium sulfate and the solvent is evaporated off in vacuo. The 11-(2'-dimethylaminoethyl)-9,10-dihydro-9,10-ethanoanthracene which remains, with ethereal hydrochloric acid, yields the hydrochloride, M.P. 259–261° which crystallizes from methanol/acetone.

EXAMPLE 34

(a) 24.5 g. of 9,10-dihydro-9,10-ethanoanthracene-11-acetonitrile, produced as described in Examples 33 (a) and (b) 14.5 g. of potassium hydroxide, 5 ml. of water and 200 ml. of isoamyl alcohol are refluxed for 24 hours. After cooling, the reaction mixture is diluted with ice water and extracted with ether. Concentrated hydrochloric acid is added to the aqueous phase until the reaction is acid to congo paper and it is then extracted with ether. The ether extract is washed with water, dried over sodium sulfate and concentrated. After adding petroleum ether to the concentrated solution, 9,10-dihydro-9,10-ethanoanthracene-11-acetic acid crystallizes, M.P. 167–172°.

(b) 8.5 g. of the carboxylic acid obtained according to (a) are refluxed for 1 hour with 25 ml. of thionyl chloride. The excess thionyl chloride is then evaporated in vacuo, the oily residue is dissolved in 20 ml. of benzene and the benzene solution is added dropwise at 20–25° while stirring to a solution of 12 g. of diethylamine in 12 ml. of water, the addition being made within 15 minutes. The reaction mixture is heated for 1 hour at 70°, then cooled, diluted with benzene and the aqueous phase is separated. The organic phase is washed with 2 N hydrochloric acid, 2 N sodium carbonate solution and with water, dried over sodium sulfate and concentrated in vacuo. The crude diethylamide which remains, dissolved in 50 ml. of anhydrous ether, is added dropwise to a suspension of 1.5 g. of lithium aluminum hydride in 100 ml. of anhydrous ether. The reaction mixture is refluxed for 15 hours and, after cooling, 1.5 ml. of water, 1.5 ml. of 15% sodium hydroxide solution and 4.5 ml. of water are added at 20°. The precipitate formed is filtered off under suction, washed with ether and the ethereal filtrate is extracted with 2 N hydrochloric acid. The acid aqueous phase is separated, made alkaline with concentrated ammonia and extracted with ether. The ether extract is washed with water, dried over sodium sulfate and the solvent is evaporated. With ethereal hydrochloric acid the residue yields 11-(2'-diethylaminoethyl)-9,10-dihydro-9,10-ethanoanthracene hydrochloride, M.P. 221–233° (from acetone/ether).

EXAMPLE 35

Starting from 9,10-dihydro-9,10-ethanoanthracene-11-acetic acid obtained in step (a) of Example 34, 11-(2'-methylaminoethyl) - 9,10 - dihydro - 9,10 - ethanoanthracene is obtained via the intermediate products 9,10-dihydro-9,10-ethanoanthracene-11-acetyl chloride and (9,10-dihydro-9,10-ethanoanthracene-11-yl)-N-methyl acetamide by following the procedure of Example 34, step (b). It is converted with ethereal oxalic acid to the acid oxalate, M.P. 226–228° (from methanol).

EXAMPLE 36

Starting from 9,10-dihydro-ethanoanthracene-11-acetic acid, 11-(2'-piperidinoethyl)-9,10-dihydro-9,10-ethanoanthracene is obtained in accordance with the procedure of Example 34, step (b), by way of the intermediate products 9,10 - dihydro-9,10-ethanoanthracene-11-acetyl chloride and N-(9,10-dihydro-9,10-ethanoanthracene-11-acetyl)-piperidine. The hydrochloride melts at 248–252° from methanol/acetone.

EXAMPLE 37

(a) 38.5 g. of diethyl malonate are added dropwise within 30 minutes to a suspension of 11.5 g. of sodium hydride (50% in paraffin oil) in 100 ml. of anhydrous dimethyl formamide and then 75 g. of 9,10-dihydro-9,10-ethanoanthracene-11-methyl p-toluene sulfonate in 200 ml. of anhydrous dimethyl formamide are added dropwise, also within 30 minutes. The reaction mixture is refluxed for 20 hours, cooled, diluted with one liter of water, concentrated hydrochloric acid is added until the reaction is acid to congo paper and it is extracted with ether. The ether extract is washed with water, dried over sodium sulfate and concentrated in vacuo, the residue is dissolved in 48% ethanol and then refluxed for 15 hours with 20 g. of potassium hydroxide. The ethanol is then evaporated off in vacuo, the aqueous alkaline distillation residue is extracted with ether, concentrated hydrochloric acid is added until the reaction is acid to congo paper and it is extracted with chloroform. The chloroform extract is washed with water, dried over sodium sulfate and evaporated in vacuo. The residue is heated for 2 hours at 160–180° under a stream of nitrogen, then cooled and taken up in ether. The ethereal solution is washed with 2 N sodium carbonate solution. The aqueous phase is separted, 2 N hydrochloric acid is added until the reaction is acid to congo paper and then it is extracted with ether. The ether solution is washed with water, dried over sodium sulfate, concentrated and petroleum ether is added, 9,10-dihydro-9-10-ethanoanthracene-11-propionic acid crystallizes out. M.P. 149–151°.

(b) 11.5 g. of the carboxylic acid obtained according to (a) are refluxed for 1 hour with 30 ml. of thionyl chloride. The excess thionyl chloride is then distilled off in vacuo, the residue is dissolved in 20 ml. of benzene and the benzene solution is added dropwise at 20–25° while stirring to 25 ml. of a 40% aqueous dimethylamine solution. The reaction mixture is heated for 1 hour at 70°, cooled and diluted with benzene. After separating the aqueous phase, the organic phase is washed with 2 N hydrochloric acid, 2 N sodium carbonate solution and water, dried over sodium sulfate and concentrated in vacuo. A solution of the residue in 35 ml. of anhydrous ether is added dropwise to a suspension of 1.0 g. of lithium aluminum hydride in 100 ml. of anhydrous ether. This reaction mixture is refluxed for 24 hours, cooled and then 1 ml. of water, followed by 1 ml. of 15% sodium hydroxide solution and finally 3 ml. of water are added. The precipitate formed is filtered off under suction and washed with ether. The combined filtrates are extracted with 2 N hydrochloric acid. Concentrated ammonia is added to the hydrochloric acid phase until the reaction is alkaline and it is extracted with ether. The ether extract is washed with water, dried over sodium sulfate and concentrated. The 11 - (3'-dimethylaminopropyl)-9,10-dihydro-9,10-ethanoanthracene obtained yields the hydrochloride, with ethereal hydrochloric acid, M.P. 191–192° (from ethyl/acetate).

EXAMPLE 38

Starting from 9,10-dihydro-9,10-ethanoanthracene-11-propionic acid prepared as deescribed in step (a) of Example 37, 11-(3'-methylamino-propyl)-9,10-dihydro-9,10-ethanoanthracene is obtained by the procedure described in Example 37, step (b), by way of the intermediate products 9,10 - dihydro-9,10-ethanoanthracene-11-propionyl chloride and N-methyl-3-(9',10'-dihydro-9',10'-ethanoanthracene-11)-propionamide. The hydrochloride melts at 213–215° (from methanol/acetone).

EXAMPLE 39

Starting from 9,10-dihydro-9,10-ethanoanthracene-11-propionic acid, 11-(3'-aminopropyl)-9,10-dihydro-9,10-ethanoanthracene is obtained by the proceduce described in Example 37, step (b) by way of the intermediate products 9,10 - dihydro - 9,10 - ethanoanthracene - 11 - propionyl chloride and 3-(9',10'-dihydro-9',10'-ethanoanthracene-11'-yl)-propionamide. The hydrochloride melts at 244–252° (from ethanol/ethyl acetate).

EXAMPLE 40

3.5 g. of 4-(9',10'-dihydro-9',10'-ethanoanthracene-11'-methyl)-1-piperazineethanol, prepared as described in Example 27, are dissolved in 25 ml. of anhydrous pyridine, the solution is cooled to 0° and 1 ml. of acetic anhydride is added thereto. The whole is then left at room temperature for 15 hours, after which it is concentrated under aspirator vacuum. The residue is taken up in benzene and again concentrated in vacuo. The residue is dissolved in methanol and methanolic hydrochloric acid is added. After adding acetone, 4 - (9',10' - dihydro - 9',10' - ethanoanthracene-11'-methyl)-1-(β-acetoxyethyl)-piperazine is obtained. The dihydrochloride, recrystallized from methanol/acetone, melts at 250–254°.

EXAMPLE 41

2.6 g. of 11-dimethylaminomethyl-9,10-dihydro-9,10-ethanoanthracene are dissolved in 30 ml. of benzene and the solution is heated to 50°. A solution of 2.1 g. of ethyl chloroformate in 15 ml. of benzene is added dropwise to this solution within 30 minutes and then the whole is refluxed for 6 hours. The cooled benzene solution is then washed with 2 N hydrochloric acid and water, dried over sodium sulfate and concentrated under aspirator vacuum. 2.9 g. of 11-(N-carbethoxy-N-methylamino)-methyl-9,10-dihydro-9,10-ethanoanthracene are obtained as an oil. This oil is refluxed for 6 hours with 2.1 g. of potassium hydroxide in 30 ml. of carbitol. It is then cooled, diluted with 200 ml. of water and extracted with diethyl ether. The ether extract is exhaustively extracted with 2 N hydrochloric acid. The hydrochloric acid extracts are made alkaline with concentrated ammonia and extracted with chloroform. These are washed with water, dried over sodium sulfate and concentrated in vacuo to yield 11-methylaminomethyl-9,10-dihydro-9,10 - ethanoanthracene. The hydrochloride prepared therefrom with ethereal hydrochloric acid crystallizes from methanol/acetone, M.P. 309–311°.

EXAMPLE 42

(a) Starting from 2-methylanthracene and acrylonitrile and following the procedure described in Example 2(a) a mixture of 2-methyl- and 3-methyl-11-cyano-9,10-dihydro-9,10-ethanoanthracene is obtained.

(b) Starting with the mixture of the 2- and 3-methyl derivatives obtained in step (a) above and following the procedure of Example 2(b) a mixture of 2-methyl- and 3 - methyl - 11 - aminomethyl - 9,10 - dihydro - 9,10 - ethanoanthracene is obtained. The separation of this mixture is carried out by fracitional crystallization analogous to the procedure described in Example 3(b).

(c) Starting with the individual intermediates obtained in step (b), supra, and following the procedure described in Example 1 there is obtained 2-methyl- and 3-methyl-11 - dimethylaminomethyl - 9,10 - dihydro - 9,10 - ethanoanthracene.

EXAMPLE 43

(a) Starting from 1,5-dichloroanthracene and acrylonitrile and following the procedure described in Example 2(a) 1,5 - dichloro-11-cyano-9,10-dihydro-9,10-ethanoanthracene is obtained.

(b) Starting with the 1,5-dichloro derivative obtained in step (a) above and following the procedure of Example 2(b) 1,5-dichloro-11-aminomethyl-9,10-dihydro-9,10-ethanoanthracene is obtained.

(c) Starting with the 1,5-dichloro derivative obtained in step (b) above and following the procedure described in Example 1, there is obtained 1,5-dichloro-11-dimethylaminomethyl-9,10-dihydro-9,10-ethanoanthracene.

EXAMPLE 44

In a steel autoclave is placed a solution of 11.7 g. of 9,10 - dihydro - 9,10 - ethanoanthracene - 11 - carboxaldehyde and 11.5 g. of cyclopropylamine in 100 ml. of anhydrous methanol. The autoclave is heated to 100° and then charged with nitrogen to a pressure of 100 atm. After 7 hours at 100° the autoclave is cooled to room temperature and the pressure is released. To the methanolic solution are then added in small portions 3.0 g. of sodium borohydride, the temperature being kept at 20° by external cooling. The reaction mixture is kept at room temperature for 15 hours and finally heated to reflux for 30 minutes. The methanol is evaporated in vacuo. The residue is dissolved in 2 N hydrochloric acid and washed with ether. The aqueous phase is made alkaline with concentrated ammonia and extracted with ether. After drying the ether phase over sodium sulfate it is evaporated to dryness in vacuo. The residue is crystallized from ether/petrol ether and yields 11-cyclopropylaminomethyl-9,10-dihydro-9,10-ethanoanthracene, M.P. 94°.

From this compound, 11-(N-cyclopropyl-N-methylaminoethyl)-9,10-dihydro-9,10-ethanoanthracene is prepared by following the procedure of Example 13.

EXAMPLE 45

(a) By using the process described in Example 27(a) and starting with the mixtures of, respectively, 1- and 4- or 2- and 3-substituted 11-carboxy-9,10-dihydro-9,10-ethanoanthracenes obtained by conventional alkaline hydrolysis from the nitriles described in Examples 4–12(a), or directly from acrylic acid and the corresponding 1- or 2-substituted anthracenes listed in Examples 4–12, there are obtained from these mixtures via the corresponding carboxylic acid chlorides, mixtures of aromatic ring-substituted 4 - (9',10'-dihydro-9',10'-ethanoanthracene-11'-carbonyl)-1-piperazine-ethanols, which latter mixtures essentially consist of about equal molar portions of two positional isomers substituted in the ethanoanthracene moiety as follows: (1) 2'- and 3'-chloro; (2) 2'- and 3'-trifluoromethyl; (3) 2'- and 3'-methoxy; (4) 2'- and 3'-methylthio; (5) 1'- and 4'-N,N-dimethylsulfamyl; (6) 2'- and 3'-N,N-dimethylsulfamyl.

(b) By using the technique of fractional crystallization described in Example 3(b), the above mixtures (1) to (6) or monosubstituted 4-(ethanoanthracene-11'-carbonyl)-1-piperazine-ethanols are separated into their components, viz.:

(1') 4 - (2' - chloro - and 4-(3'-chloro-9',10'-dihydro-9',10' - ethanoanthracene - 11' - carbonyl)-1-piperazine-ethanol, (2') 4-(2'-trifluoromethyl- and 4-(3'-trifluoromethyl-9',10' - dihydro-9',10'-ethanoanthracene-11'-carbonyl)-1-piperazine-ethanol, (3') 4-(2'-methoxy and 4-(3'-methoxy-9',10'-dihydro-9',10' - ethanoanthracene - 11' - carbonyl)-1-piperazine-ethanol, (4') 4-(2'-methylthio- and 4-(3'-methylthio-9',10'-dihydro - 9',10' - ethanoanthracene-11'-carbonyl)-1-piperazine-ethanol, (5') 4-(1'-N,N-dimethylsulfamyl- and 4-(4'-N,N-dimethylsulfamyl - 9',10' - dihydro-9',10'-ethanoanthracene-11'-carbonyl)-1-piperazine-ethanol, (6') 4-(2'-N,N-dimethylsulfamyl and 4-(3'-N,N-dimethylsulfamyl - 9',10' - dihydro-9',10'-ethanoanthracene-11'-carbonyl)-1-piperazine-ethanol.

(c) Applying the process described in Example 27(b) to the individual compounds named above under (1') to (6'), inclusive, there are obtained the 2'- and 3'-chloro-, the 2'- and 3'-trifluoromethyl-, the 2'- and 3'-methoxy, the 2'- and 3'-methylthio-, and the 1'-, 2'- 3'- and 4'-N,N-dimethylsulfamyl derivatives, respectively, of 4-(9',10'-dihydro-9',10' - ethanoanthracene-11'-methyl)-1-piperazine-ethanol.

To produce tablets and the like dosage units for oral application, the active substances above mentioned, i.e. compounds of Formulas IA, IB and IC, or the pharmaceutically acceptable salts thereof are combined, e.g. with solid pulverulent carriers such as talcum, lactose, saccharose, sorbitol, mannite; starches such as potato starch, corn starch or amylopectin; cellulose derivatives or gelatine, possibly with the addition of lubricants such as magnesium or calcium stearate or polyethylene oxides of suitable molecular weights (Carbowax) and disintegrating agents such as, e.g. alginic acid, laminaria powder or citrus pulp powder, to form tables or dragée cores.

Preferred compositions according to the invention contain 10 to 50 mg. of active compound according to the invention per tablet, and consist essentially of:

| | Parts by weight |
|---|---|
| Active compound | 250.0 |
| Lactose | 100.0–200.0 |
| Potato starch or corn starch | 150.0–360.0 |
| Stearic acid | 8.0–20.0 |
| Talcum | 100.0–200.0 |
| Magnesium stearate | 2.5–10.0 |
| Colloidal silicon oxide | 10.0–35.0 |
| Ethanol, q.s. | |

Compositions in the form of dragées cores according to the invention having the same content of active ingredients consist essentially of:

| | Parts by weight |
|---|---|
| Active compound | 250.0 |
| Lactose | 100.0–200.0 |
| Stearic acid | 8.0–20.0 |
| Potato starch | 10.0–50.0 |
| Talcum | 60.0–200.0 |
| Magnesium stearate | 2.5–10.0 |
| Colloidal silicon oxide | 5.0–60.0 |
| Ethanol, q.s. | |

The quantum satis (q.s. for 250 parts of active ingredient in 1000 g. of the solid part of the tablet or dragée core material amounts to about 90 parts by volume of ethanol.

The dragées are coated, for example, with concentrated sugar solutions which may contain, for example, shellack, gum arabic, talcum and/or titanium dioxide, or with Carbowax with the addition of talcum or titanium dioxide. Dyestuffs are added to the dragées, e.g., to distinguish between the different dosages. Soft gelatine capsules (pearl shaped closed capsules) and other closed capules consist, for example, of gelatine and contain, e.g., mixtures of the active ingredient or a suitable salt with Carbowax, and hard gelatine capsules contain, e.g., granulates of the active substance or of a suitable salt with gelatine, magnesium stearate or stearic acid. Suppositories are an example of dosage units for rectal application. The consist of a combination of the active substance or of a suitable salt with a neutral fatty base.

Ampoules for parenteral, particularly intramuscular application preferably contain a water soluble salt of the active substance according to the invention and suitable stabilising agents and, optionally, buffer substances in equeous solution. Antioxidising agents such as sodium bisulfite, sodium sulfite, ascorbic acid or rongalite (formaldehyde-sodium bisulfite compound) are suitable in particular as stabilising agents either alone or combined, in total concentrations between about 0.1–0.5 per mille. Because of its ability to form chelates, ascorbic acid has an additional stabilising effect; in this function it can also be replaced by other chelating agents. The best stability of the active ingredient is attained if the pH of the ampule solutions is between 3.5 and 5. This range can be attained, e.g. by mixtures in suitable ratio of sodium sulfite, sodium bisulfite and/or ascorbic acid, or by the addition of other buffer substances such as citric acid and/or salts thereof. In addition, the ampoules can contain a slight amount of a usual conserving agent. The daily dosage of active substance according to the invention in the treatment of mental depression ranges from about 50 to 300 mg., for an average patient; for use as spasmolytics or antiemetics, the respective ranges given hereinbefore should be observed. The following examples illustrate the production of typical forms of application for oral and for parenteral use, but the invention is in no way limited thereto.

Example I 250 g. of 11-(3'-dimethylamino-propyl)-9,10-dihydro-9, 10-ethanoanthracene hydrochloride are mixed with 175.80 g. of lactose and 169.70 parts of potato strach, the mixture is moistened with an alcoholic solution of 10 g. of stearic acid in about 90 ml. of ethanol, and granulated through a sieve. After drying, 160 g. of potato starch, 200 g. of talcum, 2.50 g. of magnesium stearate and 32 g. of colloidal silicon dioxide are mixed therewith and the resulting mixture is pressed into 10,000 tablets each weighing 100 mg. and containing 25 mg. of the aforesaid active substance. The tablets can be marked with break lines if desired to enable a closer adaptation of the dosage to be given.

Example II

A granulate is prepared from 250 g. of 11-methylaminomethyl - 9,10 - dihydro - 9,10 - ethanoanthracene hydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and pressed into 10,000 dragée centers. These are then coated with a concentrated syrup of 502.28 g. of crystallised saccarose, 6 g. of shellack, 10 g. of gum arabic, 0.22 g. of dyestuff and 1.5 g. of titanium dioxide and dried. The dragées obtained each weigh 120 mg. and contain 25 mg. of active substance.

Example III 1.25 g. of the active substance used in Example II, 0.10 g. of ascorbic acid, 0.05 g. of sodium bisulfite and 0.10 g. of sodium sulfite are dissolved in distilled water until the volume is 100 ml. This solution is used to fill ampoules, each of preferably 2 ml. and containing 25 mg. of active substance. The ampoules are heat sterilized in the usual way.

EXAMPLE IV

Manufacturing instructions for tablets containing 25 mg. of active substance.

To produce 10,000 tablets each containing 25 mg. of 11-methylaminomethyl-9,10-dihydro - 9,10-ethanoanthracene hydrochloride the following components are used:

I.

| | g. |
|---|---|
| The aforesaid active substance | 250.0 |
| Lactose | 175.8 |
| Potato starch | 169.7 |

II.

| | |
|---|---|
| Stearic acid | 10.0 |
| Ethanol (about 90 ml.), q.s. | |

III.

| | |
|---|---|
| Potato Starch | 160.0 |
| Talcum | 200.0 |
| Magnesium stearate | 2.5 |
| Colloidal silicon oxide | 32.0 |
| | 1000.0 |

The substances listed under (I) are well mixed and moistened with the granulating solution (II). The granulate dmass is passed through a sieve having 49–64 meshes per square centimeter. The moist granulate is then dried for about 12 hours at about 20°. The dried granulate is again passed through a sieve of the same mesh number and then intimately mixed with the substances listed under (III). The resulting mass is then pressed into tablets of 100 mg., containing 25 mg. of active substance each.

EXAMPLE V

Manufacturing instructions for the production of coated tablets (dragées) containing 25 mg. of the active substance each.

To produce 10,000 dragées containing each 25 mg. of 4-(9',10'-ethano-anthracene-11'-methyl)-piperazine - (1)-ethanol the following components are used:

A.

| | g. |
|---|---|
| The aforesaid active substance | 250.0 |
| Lactose | 175.9 |

B.

| | |
|---|---|
| Stearic acid | 10.0 |
| Ethanol (about 90 ml.), q.s. | |

C.

| | |
|---|---|
| Potato starch | 20.0 |
| Talcum | 165.0 |
| Magnesium stearate | 2.5 |
| Colloidal silicon oxide | 56.6 |
| | 680.0 |

The substances listed under (A) are well mixed and moistened with the granulating solution (B). The moistened mass is granulated through a sieve having 49–64 meshes per square centimeter. The moist granulate is then dried for about 12 hours at about 20° and then passed again through a sieve of the same mesh number. The dried granulate is then intimately mixed with the substances listed under (C) and the resulting mass is compressed into cores of a weight of 68 mg. containing each 25 mg. of the aforesaid active substance.

The production of the dragées is then completed in a conventional manner by applying to the cores a conventional coating solution. In this manner, dragées having each a total weight (i.e. core plus coating) of about 100 mg. and containing 25 mg. of active substance are obtained.

Similarly, dragées are obtained by replacing the active substance used in the above example by 4-chloro-11-dimethylaminomethyl-9,10-dihydro-9,10-ethanoanthracene.

EXAMPLE VI

Manufacturing instructions for the production of injection solutions containing 1.25% (weight/volume) of active substance.

To produce 50 ampoules containing each 25 mg. of 11-methylaminomethyl-9,10-dihydro - 9,10-ethanoanthracene in 2 ml. of injection solution the following components are used.

| | | |
|---|---|---|
| The aforesaid active substance | g | 1.25 |
| Sodium bisulfite | g | 0.1 |
| Glycerol | g | 2.0 |
| Distilled water, ad | ml | 100 |

The active substance and the sodium bisulfite are dissolved in about 90 ml. of distilled water. The glycerol is then added and the volume of the preparation filled up to 100 ml. with distilled water. The solution is then filtered and filled into ampoules of 2 ml. each.

Those ampoules each of which contains 25 mg. of active substance are then sterilized at 120° C. during 20 minutes.

Instead of sodium bisulfite, the same amount of cysteine can be used as an antioxidant. The preparation of injection solutions with these substances is advantageously carried out under aseptic conditions in diffuse daylight and the steam sterilization can be replaced by sterilization by filtration (as described in the "Handbook of Bacteriology" by Mackie and McCartney, p. 170, published by Livingstone Ltd., Edinburgh, Scotland (1960)).

Similarly, injection solutions are obtained by replacing the active substance used in the above example by the same amount of 11-(1'-dimethylaminoethyl-9,10-dihydro-9,10-ethanoanthracene.

EXAMPLE VII

Manufacturing instructions for the preparation of gelatin capsules containing each 25 mg. of active substance for rectal application.

To produce a capsule of 25 mg. of 4-(9',10'-dihydro-9',10'-ethanoanthracene-11'-methyl piperazine-(1)-ethanol-dihydrochloride the following are used:

|  | G. |
|---|---|
| Active substance | 0.0250 |
| Butyl-hydroxy-toluene | 0.0002 |
| Paraffin (hard) | 0.0200 |
| Paraffin oil | 0.5348 |
|  | 0.5800 |

The active substance and the paraffin are suspended in paraffin oil, as inert carrier, and butyl-hydroxy-toluene as antioxidant is added. The resulting liquid paste is then filled under sterile conditions into the soft gelatin capsules.

Similarly, gelatin capsules are obtained by replacing of active substance used in the above example by the same amount of 11-methylaminomethyl-9,10-dihydro-9,10-ethanoanthracene hydrochloride.

We claim:
1. A compound of the formula

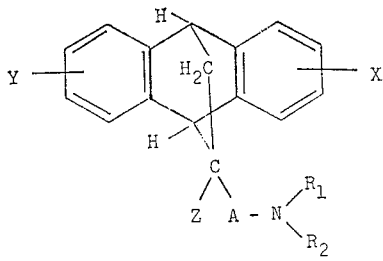

or a pharmaceutically acceptable addition salt of said compound with an acid,

A, X, Y, Z, $R_1$ and $R_2$ in the above formula having the following meanings:

A represents straight or branched chain alkylene of 1 to 5 carbon atoms, each of X and Y represents a member selected from the group consisting of hydrogen, halogen, lower alkyl, lower alkoxy, lower alkylthio, trifluoromethyl, N,N-di-lower alkylsulfamyl, mono- and di-lower alkylamino, and lower alkyl-carbonyl, Z represents a member selected from the group consisting of hydrogen and methyl, $R_1$ represents lower alkyl, $R_2$ represents a member selected from the group consisting of lower alkyl and cyclopropyl, and $R_1$ and $R_2$ taken together with the nitrogen atom to which they are linked represent a member selected from the group consisting of polymethyleneimino of from 5 to 7 ring members and morpholino.

2. A compound selected from the group consisting of 11 - dimethylaminomethyl - 9,10 - dihydro - 9,10-ethanoanthracene and a pharmaceutically acceptable addition salt thereof with an acid.

3. A compound selected from the group consisting of 1 - chloro - 11 - dimethylaminomethyl-9,10-dihydro-9,10-ethanoanthracene and a pharmaceutically acceptable addition salt thereof with an acid.

4. A compound selected from the group consisting of 4 - chloro - 11 - dimethylaminomethyl-9,10-dihydro-9,10-ethanoanthracene and a pharmaceutically acceptable salt thereof with an acid.

5. A compound selected from the group consisting of 11 - morpholinomethyl - 9,10 - dihydro - 9,10 - ethanoanthracene and a pharmaceutically acceptable addition salt thereof with an acid.

6. A compound selected from the group consisting of 11 - (1' - dimethylaminoethyl) - 9,10 - dihydro-9,10-ethanoanthracene and a pharmaceutically acceptable addition salt thereof with an acid.

7. A compound selected from the group consisting of 11 - (3' - dimethylamino - propyl) - 9,10 - dihydro - 9,10-ethanoanthracene and a pharmaceutically acceptable addition salt thereof with an acid.

8. A compound of the formula

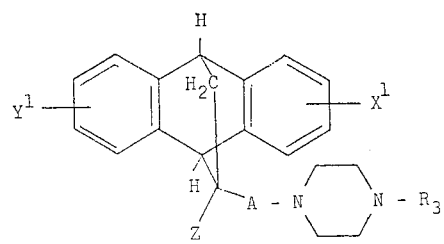

or a pharmaceutically acceptable addition salt of said compound with an acid;

A, $X_1$, $Y_1$, Z and $R_3$ in the above formula having the following meanings:

A represents straight or branched chain alkylene of 1 to 5 carbon atoms, each of $X_1$ and $Y_1$ represents a member selected from the group consisting of hydrogen, halogen, lower alkoxy, lower alkylthio, and N,N - di(lower alkyl)-sulfamyl, Z represents a member selected from the group consisting of hydrogen and methyl, and $R_3$ represents a member selected from the group consisting of hydrogen, lower alkyl, hydroxy-lower alkyl, lower alkoxy-lower alkyl and lower alkanoyloxy-lower alkyl.

9. A compound selected from the group consisting of 4 - (9',10' - dihydro - 9',10' - ethanoanthracene - 11'-methyl) - piperazine - (1) - ethanol and a pharmaceutically acceptable addition salt thereof with an acid.

10. A compound as claimed in claim 1, wherein said compound is selected from the group consisting of 11-diethylaminomethyl - 9,10 - dihydro - 9,10 - ethanoanthracene and a pharmaceutically acceptable acid addition salt thereof.

11. A compound as claimed in claim 1 wherein said compound is selected from the group consisting of 11-(2' - dimethylaminoethyl) - 9,10 - dihydro - 9,10-ethanoanthracene and a pharmaceutically acceptable acid addition salt thereof.

12. A compound as claimed in claim 1 wherein said compound is selected from the group consisting of 11-(2'-diethylaminoethyl)-9,10-dihydro - 9,10 - ethanoanthrance and a pharmaceutically acceptable acid addition salt thereof.

13. A compound as claimed in claim 1 wherein said compound is selected from the group consisting of 11-(2'-piperidinoethyl)-9,10-dihydro-9,10 - ethanoanthracene and a pharmaceutically acceptable acid addition salt thereof.

14. A compound of the class consisting of a dihydroethanoanthracene of the formula

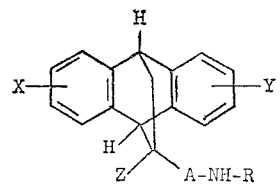

wherein:
A represents straight or branched chain alkylene of 1 to 5 carbon atoms,
each of X and Y represents hydrogen, halogen, lower alkyl, lower alkoxy, lower alkylthio, trifluoromethyl, N,N-di-lower alkyl-sulfamyl, mono-lower alkyl-amino-di-lower alkyl-amino or lower alkyl-carbonyl,
Z represents hydrogen or methyl, and
R represents lower alkyl or cyclopropyl;
and a pharmaceutically acceptable addition salt thereof with an acid.

15. A compound as defined in claim 14, wherein A represents —$CH_2$—.

16. A compound as defined in claim 14, which is racemic 11-methylaminomethyl-9,10-dihydro-9,10-ethanoanthracene.

17. A compound as defined in claim 14, which is racemic 11-methylaminomethyl-9-10-dihydro - 9,10 - ethanoanthracene hydrochloride.

18. A compound as defined in claim 14, which is selected from the group consisting of levorotatory 11-methylaminoethyl-9,10-dihydro - 9,10 - ethanoanthracene and its hydrochloride.

19. A compound as defined in claim 14 which is 11-methylaminomethyl - 11 - methyl - 9,10 - dihydro-9,10-ethanoanthracene.

20. A compound as defined in claim 14 which is 11-methylaminomethyl - 11 - methyl - 9,10 - dihydro-9,10-ethanoanthracene hydrochloride.

21. A compound as defined in claim 14, which is 4-chloro-11-methylaminomethyl - 9,10 - dihydro - 9,10-ethanoanthracene.

22. A compound as defined in claim 14, which is 1-chloro-11-methylaminomethyl - 9,10 - dihydro - 9,10-ethanoanthracene.

23. A compound as defined in claim 14, which is 11-(1' - methylamino-ethyl)-9,10-dihydro - 9,10 - ethanoanthracene.

24. A compound as defined in claim 14, which is 11-(2' - methylamino-ethyl) - 9,10 - dihydro - 9,10 - ethanoanthracene.

No references cited.

NICHOLAS S. RIZZO, *Primary Examiner.*

JOSE TOVAR, *Assistant Examiner.*

U.S. Cl. X.R.

260—570.8, 570.9, 247.2, 268, 247, 556, 326, 81, 326.3, 326.5, 294, 293.4, 293, 294.7, 501; 424—330, 34, 16, 38, 35, 250, 274, 267, 244, 248